United States Patent [19]
Canning

[11] 3,924,766
[45] Dec. 9, 1975

[54] ADJUSTABLE PROGRAM CONTROL CIRCUIT FOR TWO HYDRAULIC CYLINDERS WITH SINGLE LEVER CONTROL

[75] Inventor: Michael H. Canning, Libertyville, Ill.

[73] Assignee: International Harvester Company, Chicago, Ill.

[22] Filed: July 6, 1970

[21] Appl. No.: 52,723

Related U.S. Application Data

[63] Continuation of Ser. No. 871,790, Oct. 31, 1969, abandoned, which is a continuation of Ser. No. 668,474, Sept. 18, 1967, abandoned.

[52] U.S. Cl. .................................. 214/764; 182/2
[51] Int. Cl.² ............................................ E02F 3/86
[58] Field of Search ........ 182/2; 214/762, 763, 764, 214/771

[56] References Cited
UNITED STATES PATENTS

| | | |
|---|---|---|
| 3,007,097 | 10/1961 | Shelley et al. .......................... 214/1 |
| 3,032,215 | 5/1962 | French et al. .......................... 214/763 |
| 3,297,183 | 1/1967 | Klaviter .............................. 214/771 |
| 3,348,709 | 10/1967 | Fauchere ............................. 214/138 |
| 3,410,433 | 11/1968 | Brown................................. 214/763 |

FOREIGN PATENTS OR APPLICATIONS 847,656  9/1960  United Kingdom................. 214/132

Primary Examiner—Robert J. Spar
Assistant Examiner—Ross Weaver
Attorney, Agent, or Firm—Ronald C. Kamp; Floyd B. Harman

[57] ABSTRACT

A control system for a material handling vehicle in which the movement of one actuator controlling an implement is programmed to follow the movement of another actuator in a predetermined sequence. Feedback signals from the implement actuator are compared with similar feedback signals from the other actuator to produce control signals which operate actuation of the implement, and means are provided to selectively vary the magnitude of the second mentioned feedback signals to permit a varied control program.

13 Claims, 2 Drawing Figures

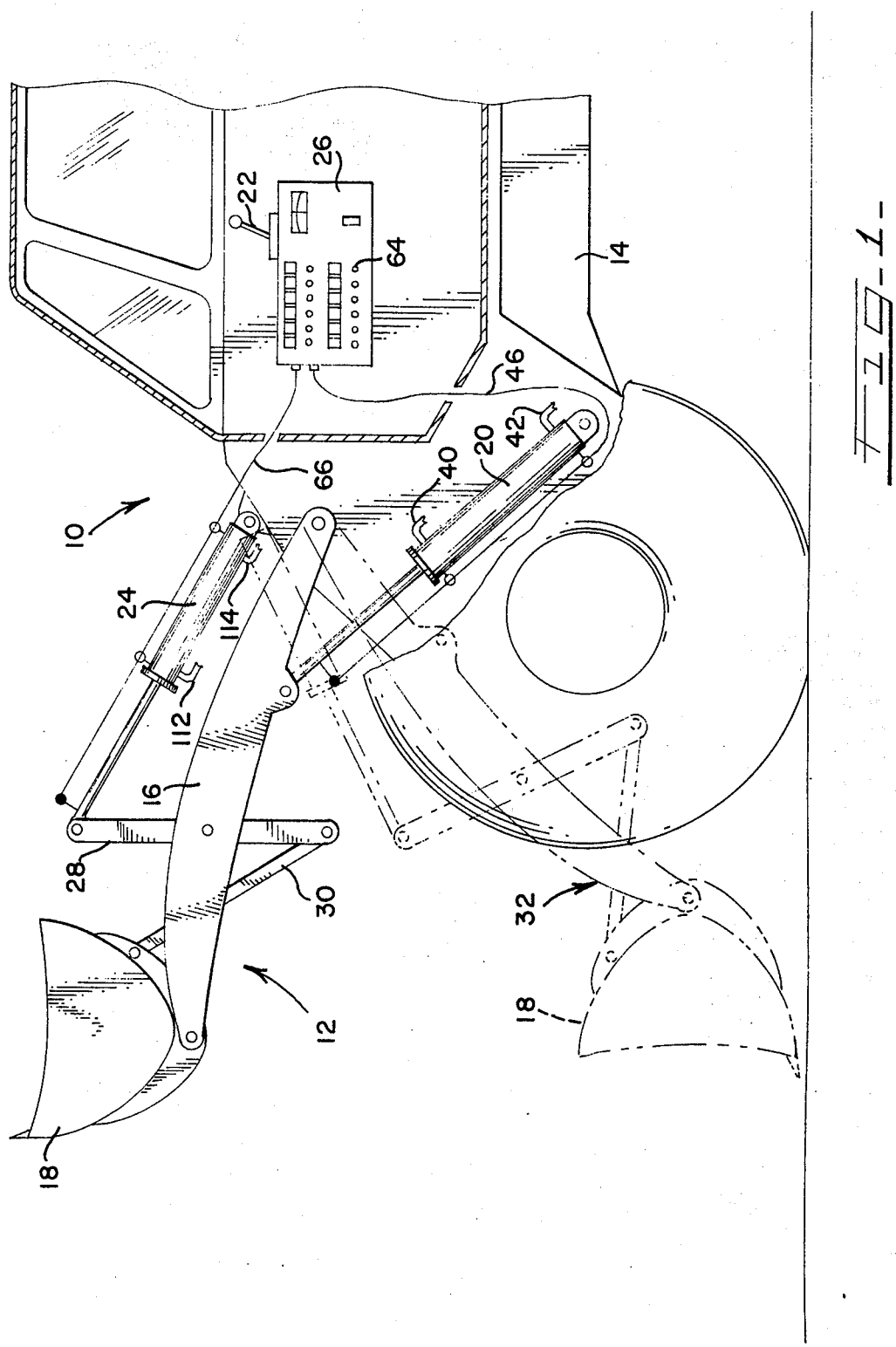

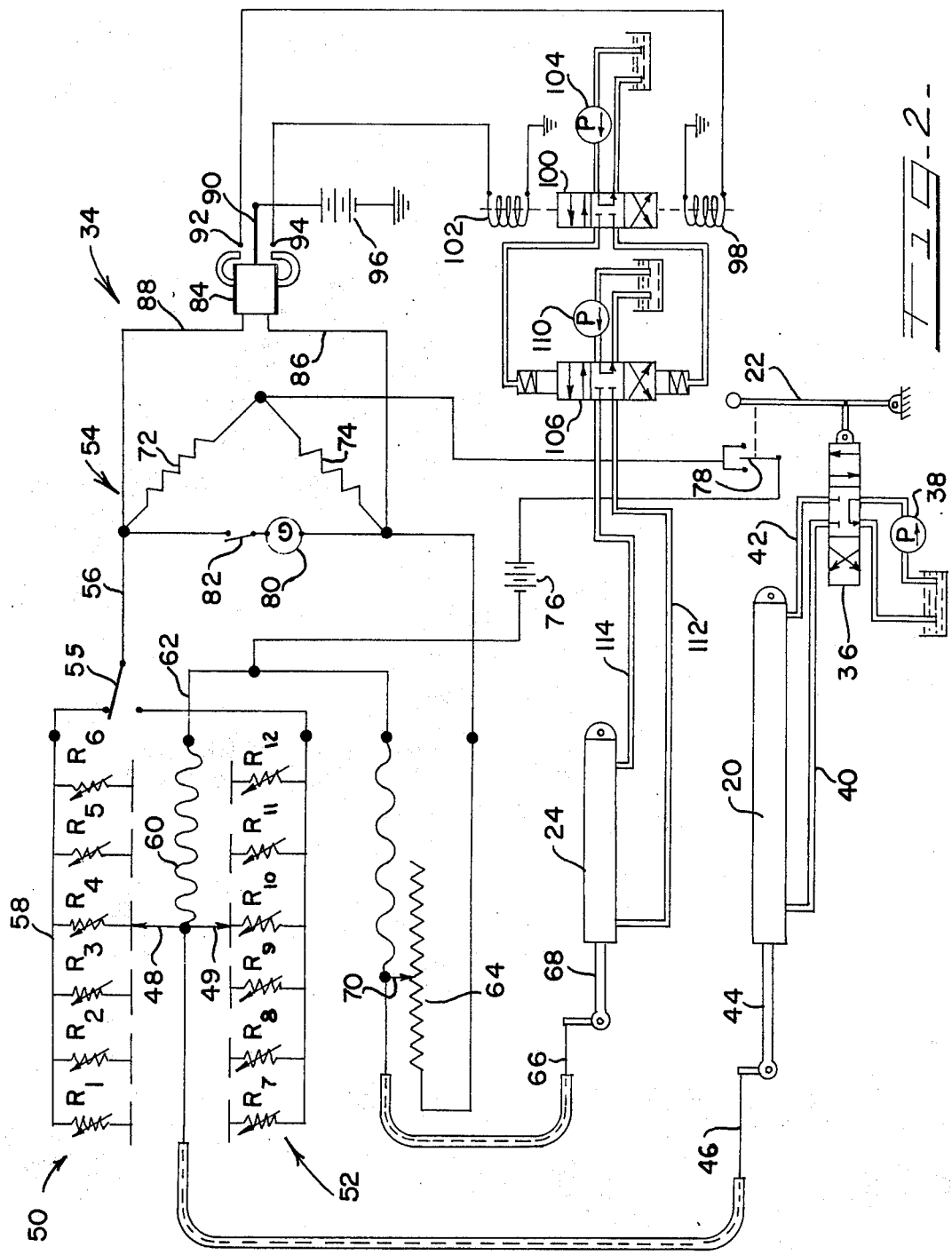

ADJUSTABLE PROGRAM CONTROL CIRCUIT FOR TWO HYDRAULIC CYLINDERS WITH SINGLE LEVER CONTROL

CROSS REFERENCE

This application is a continuation of application Ser. No. 871,790, filed Oct. 31, 1969, now abandoned, which application was a continuation of application Ser. No. 668,474, filed Sept. 18, 1967, now abandoned.

BACKGROUND OF THE INVENTION

Conventional material handling mechanisms, such as a tractor loader having a digging bucket mounted on a boom, provide separate controls for independent operation of the actuators controlling the bucket and boom. During a working cycle of these conventional loaders the operator must concentrate on manipulation of both controls, thus diverting his attention from other operations, such as control of engine speed, steering, and braking. It is desirable to provide a material handling mechanism which will be largely automatic in operation to free the operator to direct his attention for operating other vehicle controls.

SUMMARY OF THE INVENTION

The present invention relates to an automatic control system providing a programmed operation for separate actuators on a material handling mechanism. More particularly, the invention relates to a control system for a material handling mechanism having an implement mounted on a boom in which the operator controls the boom through manipulation of a single control device and in which movement of the implement is automatically controlled in a selected sequence relative to the boom as determined by a preset program.

Applicant's invention provides a simplified control system for a mechanism such as a loader in which the operation of several actuators may be controlled in a programmed relationship through operator manipulation of a single control lever, thus freeing the operator to direct his attention to other controls on the vehicle.

This invention provides an automatic system for controlling a plurality of actuators on a material handling mechanism, such as the actuators for the boom and bucket on a loader vehicle, in which movement of the boom actuator as controlled by the operator will direct a feedback signal which is compared with a similar signal received from the bucket actuator. An inbalance in these two feedback signals will condition the control system to operate the bucket actuator so that the feedback signals are again balanced. A preselected ratio of boom feedback signals to boom actuator movement will dictate the amount of bucket movement relative to boom movement. Thus when the boom is raised or lowered a given distance the bucket similarly will be pivoted forwards or backwards according to the selected program.

The invention further provides means to selectively vary programming of implement movement relative to boom movement through adjustable means to vary the ratio of boom feedback signals to boom movement.

The invention also contemplates separate program circuits, each of which incorporates a different sequence of operation of the implement relative to the boom. The operator may thus quickly select the desired program for producing the feedback signals and yet be able to selectively adjust each program circuit as desired. In the loader vehicle application, for example, one program may be used throughout elevation of the boom while the other may be used as the boom is lowered.

The invention has application in a material handling mechanism requiring repetitive work cycling. Movement of the material handling implement is programmed for automatic operation so that operator fatigue is reduced and the work cycling operation is made more efficient. The invention also has application in operator training where it is desirable to teach the correct manipulation of the controls to achieve the most efficient coordination of implement movement with boom movement.

DESCRIPTION OF THE DRAWINGS

FIG. 1 is a side elevation view, partially cut away for clarity, illustrating a material handling mechanism embodying features of the present invention; and FIG. 2 is a schematic diagram of a control system for the invention of FIG. 1.

DESCRIPTION OF THE PREFERRED EMBODIMENT

Referring now to the drawings a material handling vehicle of the front-end loader type is illustrated generally at 10. It is understood that the invention has application in other vehicles such as loggers or similar equipment employing a plurality of actuators controlling different mechanisms. Vehicle 10 comprises a conventional loader assembly 12 mounted on frame 14. Loader 12 includes a pair of boom arms 16 pivotally mounted on the frame to support digging bucket 18. The booms are raised and lowered by means of extensible hydraulic actuators 20 controlled by the operator through manipulation of control lever 22. As booms 16 are raised and lowered the attitude of bucket 18 relative to ground level is controlled through actuation of extensible hydraulic actuator 24 according to a predetermined program selected by the operator at control panel 26 by means of control system 34, FIG. 2. Extension and retraction of actuator 24 operates conventional rocker arm 28 and control link 30 on the boom to pivot bucket 18.

The broken line illustration 32 of FIG. 1 shows boom assembly 12 in its lowered position with bucket 18 in a digging position, while the full line illustration shows the elevated boom position with the bucket ready for dumping.

FIG. 2 illustrates a schematic diagram of the preferred control system 34 as used on vehicle 10. Manually operated control lever 22 shifts the spool of control valve 36 between the neutral position illustrated and left and right operating positions to respectively extend and retract boom actuator 20. In the operating positions valve 36 will direct pressurized fluid from pump 38 into a selected one of the conduits 40 and 42, and into the cylinder of actuator 20.

Movement of actuator rod 44 will produce a series of feedback signals for use in the control system. The preferred construction embodies a cable 46 connected at one end to rod 44 and at its other end to a pair of conventional sliding contacts 48 and 49. Although contacts 48 and 49 are described as moving linearly with rod 44 it is understood that conventional rotary contacts may be substituted therefor. Movement of the contacts 48 and 49 sequentially connect the variable resistors R1-R6 or R7-R12 of a selected one of the resistor banks 50 or 52 in a branch of Wheatstone bridge circuit 54. The feedback signal produced by actuator 20 is thus a voltage in the branch of bridge 54 varying in amplitude according to the resistance of the selected resistance bank. Although the preferred feedback signal is described as an electrical voltage it is understood that an equivalent signal may be produced by other means such as hydraulic pressure varying proportional to movement of rod 44.

Manually operated switch 55 is provided to select either of the resistor banks 50 or 52 for use in the control system. FIG. 2 illustrates the selection of resistor bank 50 by closing switch 55 to connect in series conductor 56, conductor 58 in parallel connection with a terminal on each resistor, contact 48, flexible conductor 60, and conductor 62 of the bridge.

Each of the resistors R1-R6 or R7-R12 of the resistor banks may be selectively varied in resistance by the operator at control panel 26 through manipulation of control knobs 64 operatively connected with the resistors (FIG. 1). Each increment of resistance for the resistors may be denoted by appropriate indicia on the control panel to enable the operator to quickly select a predetermined program by setting the control knob for each resistor at the desired indicia.

A series of feedback signals responsive to implement movement is produced by a conventional slide wire variable resistor 64. A cable 66 attached at one end to actuator rod 68 and at its other end to sliding contact 70 varies the resistance as a function of movement of rod 68. This in turn produces a voltage across a second branch of bridge 54 varying in amplitude with implement movement. It is understood that other means may be utilized to produce the implement feedback signals, such as a hydraulic pressure varying as a function of implement movement.

The remaining two branches of bridge 54 comprise resistors 72 and 74. A voltage is developed between one diagonal of the bridge. In the preferred embodiment this voltage comprises a direct current supplied by battery 76 connected into the bridge by means of switch 78 which is closed upon manipulation of lever 22 to either of the operating positions of boom control valve 36. A conventional calibration instrument, such as galvanometer 80, and switch 82 are in series connection between the other diagonal of bridge 54. This facilitates programming of the circuit so that it can be determined whether bridge 54 is in a null condition as the resistor banks 50 and 52 are being adjusted with the implement in the desired position.

With voltage from battery 76 applied across the first diagonal an inbalance between the resistances of the branches containing the selected resistor banks 50, 52 and variable resistor 64 will produce an inbalance in voltage amplitude across the second diagonal of the bridge. This voltage effects a control signal which is responsive to a predetermined difference between the two feedback signals. It is contemplated that the control signal may also comprise means sensing a pressure difference where the feedback signals comprise hydraulic pressures. The voltage control signal operates actuator 24 by means of conventional relay 84 connected in series with conductors 86 and 88 between the second bridge diagonal. Relay 84 operates switch 90 from an open position to either of two closed positions at contacts 92 and 94 depending on voltage polarity across the bridge diagonal. With contact 92 closed voltage source 96 operates solenoid 98 to move the spool of pilot control valve 100 down, while with contact 94 closed solenoid 102 is energized to move the spool up. In the null condition of bridge 54 relay 84 is de-energized so that switch 90 is open and valve 100 remains in the neutral position illustrated in FIG. 2.

With the spool of control valve 100 moved down control fluid is directed from pump 104 to move the spool of pilot operated control valve 106 down, and, similarly, with the spool of valve 100 moved up control fluid is directed to move the spool of valve 106 up. In the upper position of the valve 106 spool high pressure fluid from pump 110 is directed into conduit 112 to retract actuator 24 and in the lower spool position fluid is directed into conduit 114 to extend actuator 24. Actuator 24 continues to extend or retract depending upon the control signal from bridge 54 until the feedback signal from the implement cancels the boom feedback signal. When this occurs bridge 54 achieves its null condition so that relay 84 is de-energized to open switch 90. Operation of actuator 24 is thereby terminated.

In operation, the resistor banks 50 and 52 are adjusted so that the individual resistors are set at predetermined resistance values. One of the resistor banks, for example bank 50, may be utilized to effect a programmed coordination of implement and boom movements throughout raising of the boom, while the other bank 52 may be utilized for a varied program as the boom is lowered. Switch 55 would initially be closed in the position illustrated prior to raising of the boom.

To raise the boom the operator manipulates the single control lever 22 to extend actuator 20 and close switch 78 for energizing bridge 54 of the control system. As boom 16 moves upwardly contact 48 connects sequential ones fo the resistors R1-R6 in one branch of bridge 54. If such branch resistance differs from the resistance of resistor 64 then a voltage difference is produced across the diagonal of the bridge connected with relay 84. Energization of the relay operates actuator 24 in a direction dependent on the polarity of the voltage difference, which in turn depends on the selected resistance value in bank 50. The control signal from bridge 54 operates the actuator in a direction to vary the feedback signal of resistor 64 to return bridge 54 to a null condition. Since different values of the variable resistors R1-R6 may be connected into the bridge throughout boom movement, actuator 24 will continually reposition the implement to the desired attitude. For example, from the digging position of bucket 18 in FIG. 1 the control system may be used to roll back the bucket to the carry position as the boom is gradually elevated.

Manipulation of lever 22 by the operator to lower the boom will operate the control system 34 in a reverse program to that described above. Switch 55 may be operated to connect resistor bank 52 in the branch of bridge 54 when a varied program is desired, such as to quickly position bucket 18 in the digging attitude as the boom is rapidly lowered.

I claim:

1. In a vehicle having a hydraulically actuated boom and a work implement supported by said boom and further having an operator control station on said vehicle, a control system comprising:
   first control means for correlating movement of said implement to said boom according to a first predetermined program;
   second control means for correlating movement of said implement to said boom according to a second predetermined program;

and program selection means including a manually actuable member located at said operator control station for selectively actuating one of said first and second control means.

2. The control system of claim 1 in which said first and second control means are adapted for regulating movement of said work implement in raising and lowering of said boom, respectively, to establish different predetermined movement cycles of said implement relative to said boom during raising and lowering thereof.

3. The control system of claim 2 and further comprising means including a manually actuable member located at said operator control station for actuating said boom for movement between plural operating positions.

4. The control system of claim 2 and further comprising program adjustment means including at least one member at said operator control station for selectively varying the programs of said first and second control means to correspondingly vary the movement pattern of said implement relative to said boom.

5. The control system of claim 2 in which said first and second control means each include a pair of sensors developing control signals representative of the positions of said implement and said boom repsectively, and a comparator utilizing said pair of control signals for developing an error signal representative of a variance from the programmed correlation of said implement and said boom.

6. The control system of claim 5 in which said control means includes an actuator for displacing said implement so as to cancel said error signal and restore the programmed correlation of said implement and said boom.

7. In a vehicle having an earth-working mechanism including a hydraulically actuated boom and a hydraulically actuated implement, a control system for correlating the position of the boom with the position of the implement comprising:
  1. first circuit means including two variable impedance branches,
  2. a first indicator means operatively interconnecting the boom and one of said variable impedance branches for varying the impedance of said one impedance branch,
  3. a second indicator means operatively interconnecting the implement and the other variable impedance branch for varying the impedance in said other branch,
  4. means in said first circuit means for producing an error signal indicating a difference in the variable impedance branches,
  5. means including a second circuit actuated in response to said error signal for actuating the implement for movement to predetermined positions for each boom position so as to nullify said error signal, and
  6. said one impedance branch having more than one impedance element connected in parallel, each element having means associated therewith for presetting its impedance whereby various programs for implement position relative to boom position may be obtained.

8. In a vehicle having an earth-working mechanism including a hydraulically actuated boom and a hydraulically actuated implement, a control system for correlating the position of the boom with the position of the implement comprising:
  1. first circuit means including two variable impedance branches,
  2. a first indicator means operatively interconnecting the boom and one of said variable impedance branches for varying the impedance in said one impedance branch,
  3. said one impedance branch including two series of impedance elements and means to selectively connect either series with said first circuit,
  4. a second indicator means operatively interconnecting the implement and the other variable impedance branch for varying the impedance in said other branch,
  5. means in said first circuit means for producing an error signal indicating a difference in the variable impedance branches, and
  6. means including a second circuit actuated in response to said error signal for actuating the implement for movement to predetermine positions for each boom position so as to nullify said error signal.

9. An apparatus as defined in claim 8 in which at least one of said series of impedance elements includes means associated therewith for presetting its impedance whereby various programs for implement position relative to boom position may be obtained.

10. An apparatus as defined in claim 7 in which said means for actuating the implement movement comprises hydraulic flow control means controlled by said second circuit for directing hydraulic fluid to and from said hydraulically actuated implement.

11. In a vehicle having a material handling mechanism including a material handling implement and a linkage interconnecting said implement to said vehicle, separate hydraulic actuating means for movement of the implement and the linkage, a control system for correlating the position of the implement with the linkage comprising:
  1. a first circuit including two variable impedance means and a comparator for effectively measuring a difference in the impedances,
  2. each of said variable impedance means including more than one resistor connected in parallel, each resistor having means for presetting its value,
  3. a first indicator means interconnected between the implement and one impedance means and a second indicator means interconnected between the linkage and the other impedance means for varying said impedances according to the movements of said implement and linkage respectively, and
  4. means including a second circuit, actuated in response to said difference, for controlling the implement actuating means in response to movement of said linkage.

12. An article handling vehicle having an automatically controlled article handling implement connected to said vehicle by a mechanical linkage in which movement of said implement is dependent upon the position of said mechanical linkage comprising:
  a frame supported by said wheels;
  power means for driving said wheels and providing a source of hydraulic energy;
  a hydraulically actuated linkage connected to said mechanical linkage;
  first circuit means including two variable impedance branches;
  a first indicator means operatively interconnecting said mechanical linkage and one of said variable impedance branches for varying the impedance of said one impedance branch;

a second indicator means operately interconnecting the implement and the other of said variable impedance branches for varying the impedance therein;

means in said first circuit means for producing an error signal indicating a difference in the variable impedance branches;

means including a second circuit, actuated in response to said error signal, for actuating the implement for movement to a predetermined position for each linkage position so as to nullify said error signal; and said one impedance branch including more than one impedance element connected in parallel, each element having means associated therewith for presetting its impedance whereby various programs for implement position relative to linkage position may be obtained.

13. An apparatus as defined in claim 12 in which said impedance branches comprise resistors, and said first circuit is a direct current circuit.

* * * * *